United States Patent
Sahlsten

(10) Patent No.: US 10,371,998 B2
(45) Date of Patent: Aug. 6, 2019

(54) DISPLAY APPARATUS AND METHOD OF DISPLAYING USING POLARIZERS AND OPTICAL COMBINERS

(71) Applicant: Varjo Technologies Oy, Helsinki (FI)

(72) Inventor: Oiva Arvo Oskari Sahlsten, Salo (FI)

(73) Assignee: Varjo Technologies Oy, Helsinki (FI)

( * ) Notice: Subject to any disclaimer, the term of this patent is extended or adjusted under 35 U.S.C. 154(b) by 12 days.

(21) Appl. No.: 15/638,309

(22) Filed: Jun. 29, 2017

(65) Prior Publication Data
US 2019/0004350 A1 Jan. 3, 2019

(51) Int. Cl.
| | |
|---|---|
| G02B 27/14 | (2006.01) |
| G02F 1/1347 | (2006.01) |
| G02B 27/01 | (2006.01) |
| G02B 27/28 | (2006.01) |

(Continued)

(52) U.S. Cl.
CPC ....... *G02F 1/1347* (2013.01); *G02B 27/0101* (2013.01); *G02B 27/0172* (2013.01); *G02B 27/28* (2013.01); *G02B 5/30* (2013.01); *G02B 2027/0118* (2013.01); *G02B 2027/0194* (2013.01); *G09B 9/326* (2013.01)

(58) Field of Classification Search
CPC ...... G02B 5/30; G02B 6/0056; G02B 23/125; G02B 27/0172; G02B 27/0101; G02B 27/017; G02B 27/283; G02B 27/286; G02B 27/01; G02B 27/28; G02B 27/10; G02B 2027/0178; G02B 2027/0194; G06T 19/006
USPC ................................................. 359/630, 632
See application file for complete search history.

(56) References Cited

U.S. PATENT DOCUMENTS

| | | | |
|---|---|---|---|
| 2005/0068631 A1* | 3/2005 | Liu | G02B 6/272 359/618 |
| 2008/0151379 A1* | 6/2008 | Amitai | G02B 6/0055 359/630 |
| 2015/0323796 A1 | 11/2015 | Yang et al. | |

(Continued)

FOREIGN PATENT DOCUMENTS

EP    0977071 A1    2/2000

OTHER PUBLICATIONS

International Search Report and Written Opinion received for International Application No. PCT/FI2018/050481, dated Nov. 20, 2018, 17 pages.

*Primary Examiner* — Mahidere S Sahle
(74) *Attorney, Agent, or Firm* — Ziegler IP Law Group, LLC

(57) ABSTRACT

A display apparatus and a method of displaying, via the display apparatus. The display apparatus includes an image source, a processor configured to render an image at the image source, at least one optical combiner for combining a projection of the rendered image with a projection of a real world image, a first polarizing element for polarizing the projection of the real world image at a first polarization orientation, wherein the first polarizing element is positioned on a first side of the at least one optical combiner upon which the projection of the real world image is incident, and a second polarizing element facing a second side of the at least one optical combiner, polarization properties of the second polarizing element being adjustable, wherein the polarization properties of the second polarizing element are to be adjusted with respect to the first polarization orientation of the first polarizing element.

15 Claims, 2 Drawing Sheets

(51) Int. Cl.
*G02B 5/30* (2006.01)
*G09B 9/32* (2006.01)

(56) References Cited

U.S. PATENT DOCUMENTS

2015/0355521 A1* 12/2015 Alton .................. G02F 1/167
250/214 AL
2016/0025992 A1* 1/2016 Van Der Zouw ............................
G01N 21/8806
250/216

* cited by examiner

DISPLAY APPARATUS AND METHOD OF DISPLAYING USING POLARIZERS AND OPTICAL COMBINERS

TECHNICAL FIELD

The present disclosure relates generally to augmented reality; and more specifically, to display apparatuses comprising image sources, processors, optical combiners, and polarizing elements. Furthermore, the present disclosure also relates to methods of displaying, via the aforementioned display apparatuses.

BACKGROUND

In recent times, there has been rapid advancement in development and use of technologies such as virtual reality, augmented reality, and so forth, for presenting a simulated environment to a user. Typically, such technologies employ contemporary techniques such as stereoscopy, to provide the user with a feeling of immersion and complete involvement in the simulated environment. Furthermore, such simulated environments generally relate to fully virtual environments (namely, virtual reality), as well as real world environments including virtual objects therein (namely, augmented reality).

Typically, the user may use a device, for example, such as an augmented reality device, for experiencing such simulated environment. In such an instance, the augmented reality device may be a binocular device having dedicated display optics for each eye of the user. In other words, the displays of the binocular augmented reality device show different two-dimensional images of the virtual objects to the left and right eyes of the user for making the virtual objects appear realistic from a perspective of the user. Examples of augmented reality devices include near-eye displays such as augmented reality headsets, augmented reality glasses, and so forth.

However, conventional augmented reality devices have certain limitations. Specifically, existing techniques for overlaying (namely, superimposing) the virtual objects onto the real world environment of the user, are not sufficiently well developed. Consequently, the user's perception of the simulated environment around him/her is suboptimal. As an example, such overlaying of the virtual objects is additive in nature, thereby, allowing attributes of virtual objects (for example, such as shapes, colours, brightness, and the like, of the virtual objects) to be added to attributes of the real world environment of the user. However, in such an instance, the existing techniques do not allow for control of the attributes (for example, such as brightness, colours, and the like) of the real world environment of the user. As a result, the existing augmented reality devices are severely limited in their capability to overlay the virtual objects on areas of the real world environment that have high ambient light, thereby, limiting visibility and contrast within the simulated environment presented to the user. Furthermore, due to the aforesaid additive nature of the overlaying operation, there exist difficulties in overlaying dark virtual objects on the real world environment of the user. As an example, the existing augmented reality devices are often unable to overlay virtual objects that are darker than objects in the real world environment of the user.

Therefore, in light of the foregoing discussion, there exists a need to overcome the aforementioned drawbacks associated with conventional augmented reality devices.

SUMMARY

The present disclosure seeks to provide a display apparatus comprising an image source, a processor, at least one optical combiner, a first polarizing element, and a second polarizing element. The present disclosure also seeks to provide a method of displaying, via such a display apparatus. The present disclosure seeks to provide a solution to the existing problems associated with overlaying of virtual objects on a real world environment of a user. An aim of the present disclosure is to provide a solution that overcomes at least partially the problems encountered in prior art, and provides a robust, efficient, easy to use display apparatus that allows for the aforesaid overlaying of virtual objects on the real world environment of the user, whilst providing good visibility and contrast within a simulated environment.

In one aspect, an embodiment of the present disclosure provides a display apparatus comprising:
   an image source;
   a processor coupled to the image source, wherein the processor is configured to render an image at the image source;
   at least one optical combiner for combining a projection of the rendered image with a projection of a real world image, wherein the at least one optical combiner comprises a reflective element for substantially reflecting the projection of the rendered image towards a direction in which the projection of the real world image is directed;
   a first polarizing element for polarizing the projection of the real world image at a first polarization orientation, wherein the first polarizing element is positioned on a first side of the at least one optical combiner upon which the projection of the real world image is incident, whilst the reflective element is positioned on a second side of the at least one optical combiner; and
   a second polarizing element facing the second side of the at least one optical combiner, polarization properties of the second polarizing element being adjustable, wherein the polarization properties of the second polarizing element are to be adjusted with respect to the first polarization orientation of the first polarizing element.

In another aspect, an embodiment of the present disclosure provides a method of displaying, via a display apparatus comprising an image source, at least one optical combiner, and at least a first polarizing element and a second polarizing element, the method comprising:
   rendering an image at the image source;
   using the at least one optical combiner to combine a projection of the rendered image with a projection of a real world image;
   using the first polarizing element to polarize the projection of the real world image at a first polarization orientation, the first polarizing element being positioned on a first side of the at least one optical combiner upon which the projection of the real world image is incident; and
   adjusting polarizing properties of the second polarizing element with respect to the first polarization orientation of the first polarizing element, the second polarizing element facing a second side of the at least one optical combiner.

Embodiments of the present disclosure substantially eliminate or at least partially address the aforementioned problems in the prior art, and enables improvement in visibility and contrast within the simulated environment that includes the virtual objects overlaid on the real world environment of the user.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
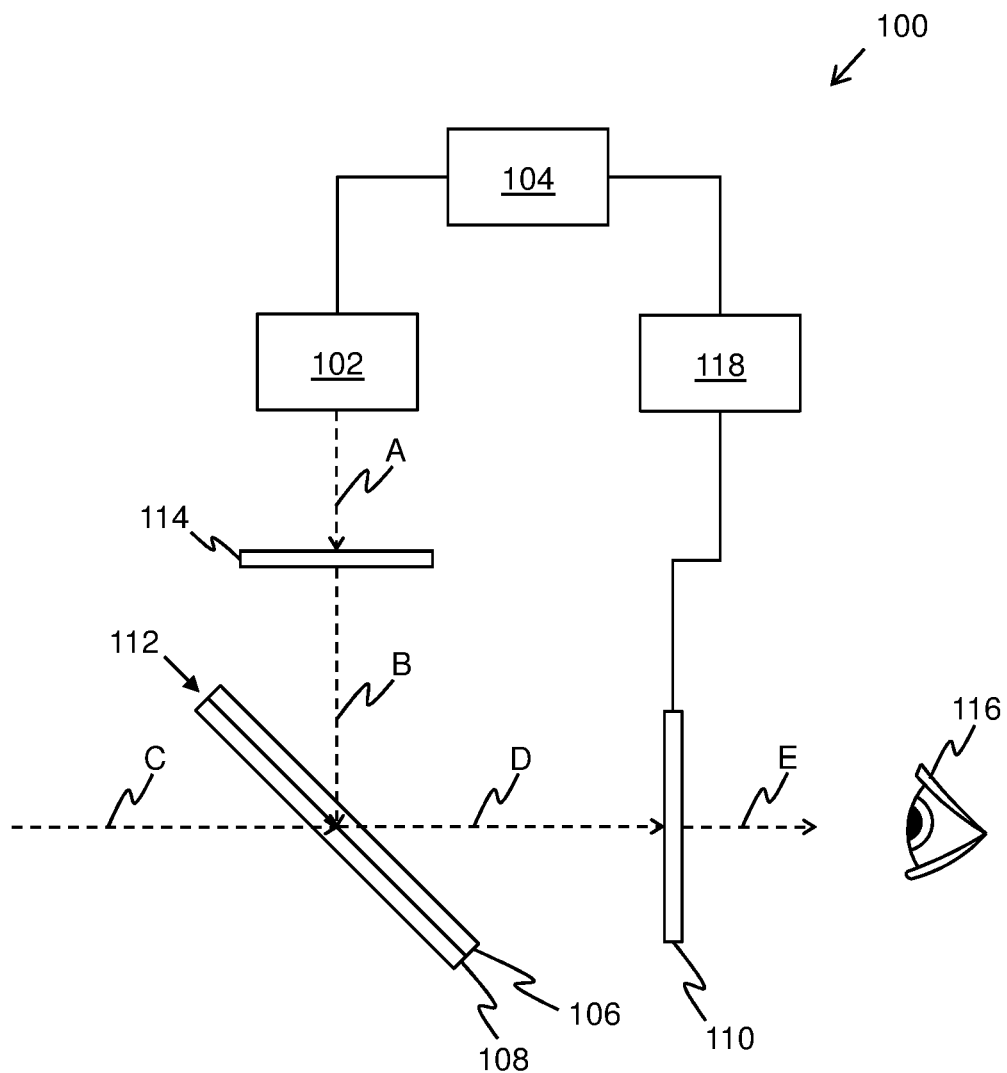
FIG. 1 illustrates an exemplary implementation of a display apparatus, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a display apparatus comprising:
an image source;
a processor coupled to the image source, wherein the processor is configured to render an image at the image source;
at least one optical combiner for combining a projection of the rendered image with a projection of a real world image, wherein the at least one optical combiner comprises a reflective element for substantially reflecting the projection of the rendered image towards a direction in which the projection of the real world image is directed;
a first polarizing element for polarizing the projection of the real world image at a first polarization orientation, wherein the first polarizing element is positioned on a first side of the at least one optical combiner upon which the projection of the real world image is incident, whilst the reflective element is positioned on a second side of the at least one optical combiner; and
a second polarizing element facing the second side of the at least one optical combiner, polarization properties of the second polarizing element being adjustable, wherein the polarization properties of the second polarizing element are to be adjusted with respect to the first polarization orientation of the first polarizing element.

In another aspect, an embodiment of the present disclosure provides a method of displaying, via a display apparatus comprising an image source, at least one optical combiner, and at least a first polarizing element and a second polarizing element, the method comprising:
rendering an image at the image source;
using the at least one optical combiner to combine a projection of the rendered image with a projection of a real world image;
using the first polarizing element to polarize the projection of the real world image at a first polarization orientation, the first polarizing element being positioned on a first side of the at least one optical combiner upon which the projection of the real world image is incident; and
adjusting polarizing properties of the second polarizing element with respect to the first polarization orientation of the first polarizing element, the second polarizing element facing a second side of the at least one optical combiner.

The present disclosure provides the aforementioned display apparatus and the aforementioned method of displaying, via the display apparatus. The described display apparatus allows for control of attributes of a real world environment of the user, whilst overlaying virtual objects onto the real world environment. Beneficially, such technique allows for improvement in visibility and contrast within the simulated environment presented to the user, thereby, allowing for overlaying of the virtual objects on areas of the real world environment that have high ambient light. Furthermore, the described display apparatus and method allow for overlaying dark virtual objects on the real world environment of the user, in an efficient manner.

Throughout the present disclosure, the "image" rendered at the image source relates to a visual representation of a virtual scene. Optionally, the virtual scene comprises at least one virtual object. Examples of the at least one virtual object include, but are not limited to, a virtual navigation tool (for example, such as a virtual map, virtual direction signage, and so forth), a virtual gadget (for example, such as a virtual calculator, a virtual computer, and so forth), a virtual message (for example, such as a virtual instant message, a virtual chat conversation, a virtual to-do note), a virtual entity (for example, such as a virtual person, a virtual animal, and so forth), and a virtual media (for example, such as a virtual video, a virtual interactive advertisement, a virtual news, virtual data, and so forth). Furthermore, in such an instance, the rendered image may be overlaid on a projection of a real world image to constitute a visual scene of a simulated environment (for example, such as an augmented reality environment). Throughout the present disclosure, the term "real world image" relates to an image depicting actual surroundings of a user whereat he/she is positioned. Optionally, the display apparatus further comprises at least one camera to capture the real world image. Furthermore, the simulated environment is presented to the user of the display apparatus, when the display apparatus is worn by the user. In such an instance, the display apparatus is operable to act as a device (for example, such as an augmented reality headset, a pair of augmented reality glasses, and the like) for presenting the simulated environment to the user.

It is to be understood that the image rendered at the image source may also be referred to as an "virtual reality image".

As mentioned previously, the processor coupled to the image source, is configured to render the image at the image source. Throughout the present disclosure, the term "image source" relates to equipment configured to facilitate rendering of the image. In one embodiment, the image source comprises at least a context image renderer for rendering a context image and a focus image renderer for rendering a focus image, wherein a projection of the rendered context image and a projection of the rendered focus image collectively form the projection of the rendered image. In such an embodiment, the image comprises the context image and the focus image. Therefore, the context and focus images may be rendered in order to collectively constitute the rendered image at the image source.

Throughout the present disclosure, the term "context image" relates to a wide image of the virtual scene, to be rendered and projected via the display apparatus, whereas the term "focus image" relates to another image depicting a part (namely, a portion) of the virtual scene, to be rendered and projected via the display apparatus. It will be appreciated that the focus image is dimensionally smaller than the context image.

Optionally, an angular width of the projection of the rendered context image ranges from 40 degrees to 220 degrees, whereas an angular width of the projection of the rendered focus image ranges from 5 degrees to 60 degrees. In such an instance, the angular width of the projection of the rendered context image may be, for example, from 40, 50, 60, 70, 80, 90, 100, 110, 120, 130, 140, 150, 160 or 170 degrees up to 70, 80, 90, 100, 110, 120, 130, 140, 150, 160, 170, 180, 190, 200, 210 or 220 degrees. Furthermore, in such an instance, the angular width of the projection of the rendered focus image may be, for example, from 5, 10, 15, 20, 25, 30, 35, 40, 45 or 50 degrees up to 15, 20, 25, 30, 35, 40, 45, 50, 55 or 60 degrees.

Throughout the present disclosure, the term "angular width" refers to an angular width of a given projection as seen from the user's eyes, when the display apparatus is worn by the user. It will be appreciated that the angular width of the projection of the rendered context image is larger than the angular width of the projection of the rendered focus image. This may be attributed to the fact that the rendered focus image is typically projected on and around a fovea of an eye, whereas the rendered context image is projected on a retina of the eye, of which the fovea is just a small part.

Throughout the present disclosure, the term "context image renderer" relates to equipment configured to facilitate rendering of the context image, whereas the term "focus image renderer" relates to equipment configured to facilitate rendering of the focus image. Optionally, the context image renderer and/or the focus image renderer are implemented by way of at least one projector. Hereinafter, the at least one projector used to implement the context image renderer is referred to as the "at least one context image projector", for the sake of convenience and clarity. Similarly, the at least one projector used to implement the focus image renderer is referred to as the "at least one focus image projector".

Optionally, the context image renderer is implemented by way of at least one context display configured to emit the projection of the rendered context image therefrom. Optionally, the focus image renderer is implemented by way of at least one focus display configured to emit the projection of the rendered focus image therefrom.

The processor could be implemented by way of hardware, software, firmware or a combination thereof, suitable for controlling the operation of the display apparatus. Optionally, the processor is configured to control the operation of the display apparatus to process and display (namely, to project) the visual scene of the simulated environment onto the eyes of the user. Additionally, optionally, the processor is communicably coupled to a memory unit that is suitable for storing images (for example, such as the image rendered at the image source and/or the real world image) to be processed by the processor.

As mentioned previously, the first polarizing element polarizes the projection of the real world image at a first polarization orientation. Throughout the present disclosure, the term "first polarizing element" relates to an optical element configured to allow only light waves of the first polarization orientation to pass therethrough, whilst blocking light waves of other polarization orientations. Therefore, the first polarizing element is configured to perform an optical filtering operation by converting the projection of the real world image, having undefined or mixed polarization, into a projection of the real world image having the first polarization orientation. In an embodiment, the first polarizing element is a circular polarizing element. In another embodiment, the first polarizing element is a linear polarizing element. As an example, the first polarizing element may be a linear polarizing element, configured to vertically polarize the projection of the real world image. Beneficially, in such an example, the first polarizing element may reduce glare emanating from the actual surroundings of the user.

It is to be understood that throughout the disclosure, the 'projection of the real world image having the first polarization orientation' is referred to as the 'polarized projection of the real world image', for the sake of convenience and clarity.

Optionally, the first polarizing element is implemented by way of at least one of: thin film polarizer, Polaroid® polarizing filter, absorptive crystal polarizer, birefringent polarizer. As an example, the first polarizing element may be implemented by way of a thin film polarizer including a substrate (for example, such as glass, plate, and the like) whereon a thin film of a specialized optical coating is applied. In such a case, the specialized optical coating (for example, such as a dielectric material) may be configured to implement the desired polarization effect. As another example, the first polarizing element may be implemented as a birefringent polarizer (for example, such as a Liquid Crystal variable retarder).

Optionally, the first polarizing element comprises a plurality of polarizing regions that are individually adjustable to have different polarization properties at a same time.

Furthermore, optionally, polarization properties of the first polarizing element are adjustable for controlling the polarized projection of the real world image. In such an instance, the processor is configured to perform (namely, implement) the aforesaid adjustment. More optionally, the polarization properties of the first polarizing element comprise at least one of: the first polarization orientation associated with the first polarizing element, the different polarization properties associated with the plurality of polarizing regions of the first polarizing element. Beneficially, such adjustment of the polarization properties of the first polarizing element allows for controlling intensity and/or amount of ambient light within the polarized projection of the real world image.

In an exemplary implementation, the first polarization orientation of the first polarizing element may be adjustable. In such a case, a voltage V1 may be applied to the first polarizing element for polarizing the projection of the real world image at a polarization orientation X1, and a voltage V2 may be applied to the first polarizing element for polarizing the projection of the real world image at another polarization orientation X2.

In another exemplary implementation, the first polarizing element may comprise four polarizing regions R1, R2, R3, and R4, within the first polarizing element. In such an instance, the polarizing regions R1, R2, R3, and R4 may be individually adjusted to have different polarization properties at a same time. Therefore, the polarization properties of the first polarizing element may be adjusted such that the regions R1, R2, and R3 are configured for polarizing the projection of the real world image at a polarization orientation X3, whereas the region R4 is configured for polarizing the projection of the real world image at a polarization orientation X4, at the same time.

Optionally, the first polarizing element is movable for adjusting a position of the polarized projection of the real world image on the at least one optical combiner in a desired manner. Optionally, in this regard, the first polarizing element is moved by actuators. More optionally, such movement includes at least one of: displacement (horizontally and/or vertically), rotation and/or tilting of the first polarizing element. Beneficially, such movement of the first polarizing element may be utilized in an event of a change in a gaze direction of the user.

As mentioned previously, the at least one optical combiner combines the projection of the rendered image with the projection of the real world image. Throughout the present disclosure, the term "at least one optical combiner" generally refers to equipment for optically combining the projection of the rendered image with the projection of the real world image to form a combined projection. Therefore, it will be appreciated that the term "combined projection" relates to a projection comprising the projection of the real world image and the projection of the rendered image. Furthermore, the combined projection is representative of the visual scene of the simulated environment. It is to be understood that the combined projection includes the virtual scene overlaid on the actual surroundings of the user. Beneficially, the combined projection is projected towards the eyes of the user so as to allow the user to experience the simulated environment. In such an instance, the display apparatus is said to operate in a 'mixed-reality mode'.

It will be appreciated that the combined projection that is projected from the at least one optical combiner, towards the eyes of the user, comprises the polarized projection of the real world image and the polarized projection of the rendered image.

Furthermore, as mentioned previously, the reflective element of the at least one optical combiner substantially reflects the projection of the rendered image towards a direction in which the projection of the real world image is directed. It will be appreciated that the projection of the real world image (namely, the polarized projection of the real world image) is directed towards the eyes of the user. Therefore, the aforesaid reflective element substantially reflects the projection of the rendered image towards the eyes of the user. Optionally, the reflective element of the at least one optical combiner is implemented by way of at least one of: a reflective surface of the at least one optical combiner, a reflective coating on a surface of the at least one optical combiner.

Moreover, the first polarizing element is positioned on the first side of the at least one optical combiner upon which the projection of the real world image is incident, whilst the reflective element is positioned on the second side of the at least one optical combiner. It will be appreciated that the second side of the at least one optical combiner may or may not be opposite to the first side. In one example, the at least one optical combiner may be implemented by way of a semi-transparent mirror, for example, such as a pellicle mirror. In such an example, the first and second sides of the at least one optical combiner may be opposite to each other. In another example, the at least one optical combiner may be implemented by way of a prism. In such an example, the second side may not be opposite to the first side, but instead, may be adjacent to the first side. It will be appreciated that such arrangement of the first polarizing element and the at least one optical combiner allows for the projection of the real world image, having undefined or mixed polarization, to be incident on the first polarizing element. In such an instance, only the polarized projection of the real world image may be directed towards the second side of the at least one optical element, and consequently, towards the eyes of the user.

Optionally, the at least one optical combiner comprises the first polarizing element. More optionally, in this regard, the at least one optical combiner and the first polarizing element are implemented by way of a single structure. In an embodiment, the single structure comprises both the at least one optical element and the first polarizing element, bonded or arranged together by suitable techniques employing use of materials/equipment such as adhesives, screws, mechanical clamps, and so forth. In another embodiment, the at least one optical element and the first polarizing element are implemented as separate (namely, different) surfaces of the single structure. Optionally, in this regard, the separate surfaces of the single structure comprise a polarizing coating to implement the first polarizing element and the reflective coating to implement the reflective element of the at least one optical combiner.

It will be appreciated that in the aforesaid single structure, the first polarizing element and the at least one optical combiner are arranged in a manner that the projection of the real world image is incident on the first polarizing element, and the polarized projection of the real world image is transmitted substantially through the first polarizing element, towards the at least one optical combiner. Moreover, in the aforesaid single structure, the polarized projection of the real world image is incident on the at least one optical combiner, and is transmitted substantially therethrough, towards the eyes of the user. Optionally, in this regard, the polarized projection of the real world image is transmitted through the reflective element of the at least one optical combiner, towards the eyes of the user.

Optionally, the at least one optical combiner is implemented by way of at least one of: a semi-transparent mirror, a prism, a polarizer, an optical waveguide. As an example, the at least one optical combiner may be implemented as an optical waveguide. In such a case, the optical waveguide may be arranged to allow the projection of the real world image to pass therethrough substantially, whilst reflecting the projection of the rendered image substantially towards a field of vision of the eyes of the user. It will be appreciated that in such an example, the optical waveguide is semi-transparent (namely, substantially transparent such that the projection of the real world image is visible to the user's eyes therethrough, whilst being substantially reflective such that the projection of the rendered image is reflected towards the user's eyes therefrom). Optionally, in another case, the optical waveguide may be arranged to allow the projection of the rendered image to pass therethrough substantially, whilst reflecting the projection of the real world image substantially towards the field of view of the eyes of the user. Beneficially, implementation of the at least one optical combiner by way of the optical waveguide allows for a reduction of size of the display apparatus.

Optionally, the at least one optical combiner is switchable to different levels of transparency. More optionally, the transparency of the at least one optical combiner is controlled electrically to combine the projection of the rendered image with the projection of the real world image, as desired by the user. In an example, the at least one optical combiner may be semi-transparent (for example, 30 percent, 40 percent, 50 percent, 60 percent, or 70 percent transparent) to combine the projection of the rendered image with the projection of the real world image for projection onto the eyes of the user, to operate the display apparatus in the 'mixed-reality mode'. In another example, the at least one optical combiner may be highly transparent (for example, 80 percent, 90 percent, or 100 percent transparent) such that only the projection of the real world image is projected onto the eyes of the user, to operate the display apparatus in a 'see-through mode'. In the 'see-through mode', the projection of the rendered image is suppressed from being projected onto the eyes of the user. In yet another example, the at least one optical combiner may be highly opaque (for example, 10 percent or 20 percent transparent) such that only the projection of the rendered image is projected onto the eyes of the user. In such a case, the projection of the real world image may be suppressed from being projected onto the eyes of the user.

According to an embodiment, the at least one optical combiner is curved in shape. It will be appreciated that the curved shape of the at least one optical combiner can be in any suitable direction and shape, for example such as an outside-in hemisphere, an inside-out hemisphere, a parabolic shape, and so forth. Beneficially, the curved shape of the at least one optical combiner potentially increases the field of view of the display apparatus and allows for a reduction of the size of the display apparatus. Furthermore, the curved shape of the at least one optical combiner enables a reduction in geometric and chromatic aberrations occurring within the display apparatus.

According to another embodiment, the at least one optical combiner is flat (namely, planar) in shape. According to yet another embodiment, the at least one optical combiner is freeform in shape. Optionally, in this regard, the freeform shape is implemented as a combination of flat and curved surfaces including protrusions and depressions on a surface of the at least one optical combiner. It will be appreciated that such a freeform-shaped optical combiner has dual benefit over a flat (namely, planar) optical combiner. Firstly, a wider field of view is potentially achieved by employing a dimensionally smaller freeform-shaped optical combiner, as compared to a flat optical combiner. Secondly, the freeform-shaped optical combiner potentially serves as a lens subsystem for controlling an optical path of the combined projection.

Optionally, the at least one optical combiner is moved by at least one actuator associated therewith for adjusting the combined projection, to be projected onto the eyes of the user. More optionally, the at least one actuator associated with the at least one optical combiner is controlled automatically to move the at least one optical combiner. As an example, the at least one actuator may move the at least one optical combiner closer or away from the eyes of the user. As another example, the at least one actuator may move the at least one optical combiner vertically up and down with respect to the eyes of the user. As yet another example, the at least one actuator may tilt and/or rotate the at least one optical combiner with respect to the eyes of the user.

Optionally, the at least one optical combiner is further configured to combine the projection of the rendered context image and the projection of the rendered focus image to form the projection of the rendered image. It will be appreciated that use of a same at least one optical combiner to form the projection of the rendered image as well as the combined projection, is beneficial for enhancing realism in the visual scene of the simulated environment when the display apparatus operates in the 'mixed-reality mode'. Such a benefit in quality of the rendered simulated environment is attributed to a precision in an optical alignment between the combined projection and the projection of the real world image through the same at least one optical combiner. Moreover, in such an instance, disparities in viewing the rendered simulated environment due to the movement of the eyes of the user are minimal.

As mentioned previously, the second polarizing element of the display apparatus faces the second side of the at least one optical combiner. In such an instance, the second polarizing element is positioned on an optical path of the combined projection, between the reflective element of the at least one optical combiner and the eyes of the user. Throughout the present disclosure, the term "second polarizing element" relates to an optical element configured to allow only light waves of a predefined polarization orientation to pass therethrough, whilst blocking light waves of other polarization orientations. Therefore, the second polarizing element is configured to perform an optical filtering operation by converting the combined projection, having undefined or mixed polarization, into a combined projection having the predefined polarization orientation.

It is to be understood that throughout the disclosure, the 'combined projection having the predefined polarization orientation' is referred to as the 'polarized combined projection', for the sake of convenience and clarity. Furthermore, it is to be understood that the predefined polarization orientation is defined by the polarization properties of the second polarizing element. Optionally, the predefined polarization is a second polarization orientation. In such an instance, the second polarizing element is configured to polarize light incident thereupon (namely, the combined projection) at the second polarization orientation. In one embodiment, the second polarization orientation is substantially perpendicular (namely, orthogonal) to the first polarization orientation, thereby substantially suppressing the projection of the real world image. Consequently, suppression of the projection of the real world image allows for reduction of ambient light within the display apparatus. In such an instance, only the projection of the rendered image (namely, the projection of the virtual scene) may be incident on the eyes of the user.

In an embodiment, the second polarizing element is a circular polarizing element. In another embodiment, the second polarizing element is a linear polarizing element.

Optionally, the second polarizing element is implemented by way of at least one of: thin film polarizer, Polaroid® polarizing filter, absorptive crystal polarizer, birefringent polarizer. As an example, the second polarizing element may be implemented by way of a thin film polarizer including a substrate (for example, such as glass, plate, and the like) whereon a thin film of a specialized optical coating is applied. In such a case, the specialized optical coating (for example, such as a dielectric material) may be configured to implement the desired polarization effect. As another example, the second polarizing element may be implemented as a birefringent polarizer (for example, such as a Liquid Crystal variable retarder).

Optionally, the second polarizing element comprises a plurality of polarizing regions that are individually adjustable to have different polarization properties at a same time. Beneficially, the individually adjustable polarizing regions in the second polarizing element allow for controlling transmissibility of ambient light in the combined projection. Specifically, such individual adjustment of the polarizing regions allows for controlling transmissibility of the ambient light in the projection of the real world image, in a region-wise manner.

The polarization properties of the second polarizing element are adjustable, and are to be adjusted with respect to the first polarization orientation of the first polarizing element. It will be appreciated that the polarization properties of the second polarizing element are adjustable for controlling the polarized combined projection. Optionally, the polarization properties of the second polarizing element are manually adjustable. Alternatively, optionally, the processor is configured to perform (namely, implement) the aforesaid adjustment.

Optionally, the polarization properties of the second polarizing element comprise at least one of: the second polarization orientation associated with the second polarizing element, the different polarization properties associated with the plurality of polarizing regions of the second polarizing element. Beneficially, such adjustment of the polarization properties of the second polarizing element allows for controlling intensity and/or amount of ambient light within the polarized combined projection.

In an exemplary implementation, the second polarization orientation of the second polarizing element may be adjustable. In such a case, different voltages may be applied to the second polarizing element for polarizing the combined projection at different polarization orientations.

In another exemplary implementation, the different polarization properties associated with the plurality of polarizing regions of the second polarizing element may be adjustable. As an example, the processer may render an image of a virtual instruction panel (namely, a graphical panel) at the image source. Furthermore, the display apparatus may be configured to overlay the virtual instruction panel on a window in the surroundings of the user. Therefore, the window may be understood to represent a 'rendering region' within a real world image of the surroundings of the user, wherein the rendering region relates to a region whereat the rendered image is to be overlaid. In such an instance, the user of the display apparatus may wish to suppress ambient light in the rendering region within the projection of the real world image, so as to allow the virtual instruction panel to be clearly visible when the projections of the rendered image and the real world image are combined. In such an instance, the user may manually adjust polarization properties of the plurality of polarizing regions of the second polarizing element, such that the ambient light in the rendering region is substantially suppressed.

Optionally, the second polarizing element is movable for adjusting a position of the polarized combined projection on the eyes of the user, in a desired manner. Optionally, in this regard, the second polarizing element is moved by actuators. More optionally, such movement includes at least one of: displacement (horizontally and/or vertically), rotation and/or tilting of the second polarizing element. Beneficially, such movement of the second polarizing element may be utilized in an event of a change in a gaze direction of the user.

Furthermore, optionally, the display apparatus further comprises a control unit for electrically controlling the second polarizing element to adjust the polarization properties of the second polarizing element, wherein the control unit is coupled to the processor, the processor being configured to control the control unit to adjust the polarization properties of the second polarizing element. Throughout the present disclosure, the term "control unit" relates to hardware, software, firmware or a combination thereof, suitable for controlling the operation of the second polarizing element. As an example, the control unit may apply a voltage V3 to the second polarizing element for polarizing the combined projection at a polarization orientation X5. Beneficially, use of the control unit may ease (namely, reduce) a processing load of the processor of the display apparatus.

Moreover, optionally, the display apparatus further comprises an ambient light sensor for detecting an intensity of ambient light, the ambient light sensor being coupled to the processor, the processor being configured to adjust the polarization properties of the second polarizing element, via the control unit, to adjust a brightness of the real world image depending on the detected intensity of the ambient light. Optionally, in this regard, the ambient light sensor may be arranged on an outer surface of the display apparatus. As an example, the ambient light sensor may detect the intensity of ambient light in a park whereat the user of the display apparatus may be positioned. It may be evident that on a bright sunny day, the detected intensity of ambient light may be high. Consequently, in such an instance, brightness of the real world image of the park may be high. Therefore, the processor may adjust the second polarization orientation of the second polarization element to be substantially perpendicular to the first polarization orientation, so as to reduce an intensity of the detected ambient light in the polarized combined projection. Beneficially, such adjustment of the second polarization orientation consequently adjusts the brightness of the real world image, as seen by the eyes of the user. It will be appreciated that such adjustment of the brightness of the real world image allows a virtual scene that is to be overlaid on the projection of the real world image, to be clearly visible with regards to the real world image.

Optionally, the processor is configured to control the image source to adjust a brightness of the rendered image. In such an instance, the processor may adjust the brightness of the rendered image in accordance with the real world image depicting the actual surroundings of the user whereat he/she is positioned. As an example, if the user wearing the display apparatus is standing in a dimly-lit room, the real world image captured by the at least one camera of the display apparatus would be substantially dark. In such an instance, the processor may control the image source to increase brightness of the rendered image, such that a virtual object in the rendered image may be clearly visible to the user, when the rendered image is overlaid on a projection of the dimly-lit room.

Furthermore, optionally, the display apparatus further comprises a third polarizing element positioned in an optical path between the image source and the at least one optical combiner, wherein the third polarizing element is configured to polarize the projection of the rendered image at a third polarization orientation, the third polarization orientation being different from the first polarization orientation. Throughout the present disclosure, the term "third polarizing element" relates to an optical element configured to allow only light waves of the third polarization orientation to pass therethrough, whilst blocking light waves of other polarization orientations. Therefore, the third polarizing element is configured to perform an optical filtering operation by converting the projection of the rendered image, having undefined or mixed polarization, into a projection of the rendered image having the third polarization orientation. As an example, the projection of the rendered image emanating from an image source comprising a context display and a focus display, may be polarized at a specific polarization orientation (for example, such as a mixed polarization orientation). In such an instance, the third polarizing element is configured to allow only the projection of the rendered image, having the third polarization orientation, to substantially pass therethrough.

In an embodiment, the third polarizing element is a circular polarizing element. In another embodiment, the third polarizing element is a linear polarizing element.

It is to be understood that throughout the disclosure, the 'projection of the rendered image having the third polarization orientation' is referred to as the 'polarized projection of the rendered image', for the sake of convenience and clarity.

Optionally, the third polarizing element is implemented by way of at least one of: thin film polarizer, Polaroid® polarizing filter, absorptive crystal polarizer, birefringent polarizer. Optionally, the third polarizing element comprises a plurality of polarizing regions that are individually adjustable to have different polarization properties at a same time.

Furthermore, optionally, polarization properties of the third polarizing element are adjustable for controlling the polarized projection of the real world image. More optionally, the polarization properties of the third polarizing element comprise at least one of: the third polarization orientation associated with the third polarizing element, the different polarization properties associated with the plurality of polarizing regions of the third polarizing element.

Moreover, optionally, the third polarization orientation is substantially perpendicular (namely, orthogonal) to the first polarization orientation. In such an instance, an angular difference between the third polarization orientation and the first polarization orientation is approximately 90 degrees. It will be appreciated that the aforesaid relationship between the third and first polarization orientations beneficially suppresses unwanted light waves and visual artifacts (for example, light spots, ghosting of the image rendered at the image source, and the like) within the display apparatus. As an example, the first polarizing element may be a linear polarizing element, configured to vertically polarize the projection of the real world image whereas the third polarizing element may be a linear polarizing element, configured to horizontally polarize the projection of the rendered image. In such an example, since the third polarization orientation is substantially orthogonal to the first polarization orientation, the suppression of unwanted light waves and visual artifacts is maximum, thereby achieving an optimal contrast of the rendered image.

Optionally, the third polarizing element is movable for adjusting a position of the polarized projection of the rendered image on the at least one optical combiner in a desired manner. Optionally, in this regard, the third polarizing element is moved by actuators. More optionally, such movement includes at least one of: displacement (horizontally and/or vertically), rotation and/or tilting of the third polarizing element. Beneficially, such movement of the third polarizing element may be utilized in an event of a change in a gaze direction of the user.

Furthermore, optionally, the processor is configured to control the control unit to adjust the polarization properties of the second polarizing element with respect to the third polarization orientation of the third polarizing element, so as to control a brightness of the rendered image. In such an instance, the second and third polarizing elements may be separately controlled with respect to each other, to allow for controlling polarization of the projection of the rendered image. It will be appreciated that in such an instance, the third polarizing element dedicatedly polarizes the projection of the rendered image at the third polarization orientation, whereas the second polarizing element polarizes the combined projection, which includes the polarized projection of the rendered image. Therefore, the third and second polarizing elements collectively control polarization of the projection of the rendered image.

Moreover, optionally, the display apparatus further comprises means for detecting a gaze direction coupled in communication with the processor, wherein the processor is configured to adjust at least one of the first polarizing element, the second polarizing element, and the third polarizing element, based upon the detected gaze direction.

Throughout the present disclosure, the "means for detecting the gaze direction" relates to specialized equipment for tracking a direction of gaze of the eye and the movement of the eye, for example such as eye trackers. It will be appreciated that an accurate detection of the gaze direction potentially allows the display apparatus to closely implement gaze contingency thereon. Moreover, the means for detecting the gaze direction may or may not be placed in contact with the eye. Examples of the means for detecting a gaze direction include, but are not limited to, contact lenses with sensors, cameras monitoring position of pupil of the eye, and so forth.

In an embodiment, the processor is configured to use the detected gaze direction to determine a region of visual accuracy of an input image. It will be appreciated that the term "input image" used herein generally refers to an image (for example, such as an image depicting the visual scene of a simulated environment) to be displayed via the display apparatus. Therefore, the input image depicts the visual scene of the simulated environment, and thereby, relates to a combination of the real world image and the rendered image. For example, the input image may be an image depicting a visual scene of a coffee shop environment whereat the user is positioned, such that the visual scene includes three virtual menus of food and drinks available for purchase at the coffee shop. In such a case, the real world image may depict the coffee shop environment, while the image rendered at the image source may depict the three virtual menus of food and drinks.

Furthermore, it will be appreciated that the term "region of visual accuracy" generally refers to a region within the input image whereat the detected gaze direction of the eye is found to be focused. Optionally, the region of visual accuracy is a region of interest (namely, a fixation point) within the input image, and is projected onto the fovea of the eye. Referring to the aforementioned example, the region of visual accuracy in the input image depicting the coffee shop environment may be at one of the three virtual menus of food and drinks. Moreover, the region of visual accuracy may be the region of focus within the input image. Therefore, it will be appreciated that the region of visual accuracy relates to a region resolved to a much greater detail as compared to other regions of the input image, when the input image is viewed by the human visual system.

Furthermore, optionally, the processor is configured to adjust at least one of the first polarizing element, the second polarizing element, and the third polarizing element, based upon the detected gaze direction, by at least one of: adjusting the first polarization orientation, adjusting the polarization properties of the second polarizing element, adjusting the third polarization orientation, moving the first polarizing element, moving the second polarizing element, moving the third polarizing element. Such adjustment of first polarizing element, the second polarizing element and/or the third polarizing element has been described herein previously. Optionally, the aforesaid adjustment of the first polarizing element, the second polarizing element and/or the third polarizing element is implemented in order to accommodate for shift in the detected gaze direction of the user. It will be appreciated that the aforementioned adjustment, allows for the display apparatus to project the region of visual accuracy of the input image onto the fovea of both eyes of the user.

Therefore, it is to be understood that the display apparatus optionally simulates active foveation of the human visual system by detecting gaze direction of the eye and adjusting the components (such as the first polarizing element, the second polarizing element, and/or the third polarizing element) within the display apparatus accordingly. Therefore, the display apparatus implements gaze contingency to imitate the human visual system.

According to an embodiment, the processor is configured to control the image source for masking a region of the context image corresponding to the region of visual accuracy of the input image such that transitional area seams (namely, edges) between the region of visual accuracy of the input image and a remaining region of the rendered image are reduced, for example minimized. It will be appreciated that the region of visual accuracy of the displayed input image corresponds to the projection of the focus image (and the masked region of the context image), whereas the remaining region of the displayed input image corresponds to the projection of the context image. Optionally, the masking is performed as a gradual gradation in order to reduce, for example to minimize, the transitional area seams between the superimposed context and focus images so that the projection of the rendered image appears continuous. For example, the image source may include a context image renderer and a focus image renderer, wherein the context image renderer and the focus image renderer are implemented by way of a context display and a focus display, respectively. In such a case, the processor may significantly dim pixels of the context image corresponding to the region of visual accuracy of an input image (for example, an image of a virtual beach environment), and gradually reduce an amount of dimming of the pixels with an increase in a distance thereof from the region of visual accuracy of the input image.

Optionally, masking the region of the context image that substantially corresponds to the region of visual accuracy of the input image is performed using linear transparency mask blend of inverse values between the context image and the focus image at the transition area, stealth (namely, camouflage) patterns containing shapes naturally difficult for detection by the eyes of the user, and so forth. If an alignment of the projections of the rendered context and focus images is improper, namely has discontinuities, then the projection of the rendered image, and consequently, the combined projection would also appear improper. Therefore, upon implementation of such masking, beneficially, the displayed input image using the described display apparatus appears continuous due to proper combination of its constituent projections (namely, the projections of the rendered image and the real world image).

In one embodiment, the display apparatus comprise arrangements described in patent applications U.S. Ser. No. 15/366,424 and U.S. Ser. No. 15/366,497 filed 1 Dec. 2016 in United States patent and trademark office, the disclosures being incorporated entirely herein by reference.

The present disclosure also relates to the method as described above. Various embodiments and variants disclosed above apply mutatis mutandis to the method.

DETAILED DESCRIPTION OF THE DRAWINGS

Referring to FIG. 1, illustrated is an exemplary implementation of a display apparatus 100, in accordance with an embodiment of the present disclosure. As shown, the display apparatus 100 comprises an image source 102, a processor 104 coupled to the image source 102, at least one optical combiner 106, a first polarizing element 108, and a second polarizing element 110. Optionally, in the display apparatus 100, the at least one optical combiner 106 comprises the first polarizing element 108. Therefore, the at least one optical combiner 106 and the first polarizing element 108 are implemented by way of a single structure 112. The processor 104 is configured to render an image at the image source 102. In the given FIG. 1, a projection of the rendered image is depicted as ray A. Optionally, the display apparatus 100 comprises a third polarizing element 114 positioned in an optical path between the image source 102 and the at least one optical combiner 106, wherein the third polarizing element 114 is configured to polarize the projection of the rendered image at a third polarization orientation. Therefore, the polarized projection of the rendered image is depicted as ray B. In the given FIG. 1, a projection of a real world image is depicted as ray C. Furthermore, the first polarizing element 108 is configured to polarize the projection of the real world image at a first polarization orientation, wherein the first polarizing element 108 is positioned on a first side of the at least one optical combiner 106 upon which the projection of the real world image is incident. Moreover, the at least one optical combiner 106 is configured to combine the polarized projection of the rendered image with the polarized projection of the real world image. The at least one optical combiner 106 comprises a reflective element (not shown) for substantially reflecting the projection of the rendered image towards a direction in which the projection of the real world image is directed (namely, towards an eye 116 of a user). The reflective element is positioned on a second side of the at least one optical combiner 106. Therefore, ray D depicts a combined projection comprising the polarized projection of the rendered image and the polarized projection of the real world image. As shown, the second polarizing element 110 faces the second side of the at least one optical combiner 106. Moreover, polarization properties of the second polarizing element 110 are adjustable and such polarization properties are to be adjusted with respect to the first polarization orientation of the first polarizing element 108. Therefore, ray E depicts a polarized combined projection that is directed towards the eye 116 of the user. Optionally, the display apparatus 100 comprises a control unit 118 for electrically controlling the second polarizing element 110 to adjust the polarization properties of the second polarizing element 110. The control unit 118 is coupled to the processor 104, the processor 104 being configured to control the control unit 118 to adjust the polarization properties of the second polarizing element 110.

It is to be understood by a person skilled in the art that the FIG. 1 includes a simplified arrangement for implementation of the display apparatus 100 for the sake of clarity, which should not unduly limit the scope of the claims herein. In the FIG. 1, coupling between components of the display apparatus 100 is depicted by solid lines and paths of rays within the display apparatus 100 is depicted by dashed lines. The person skilled in the art will recognize many variations, alternatives, and modifications of embodiments of the present disclosure.

Figure 2:
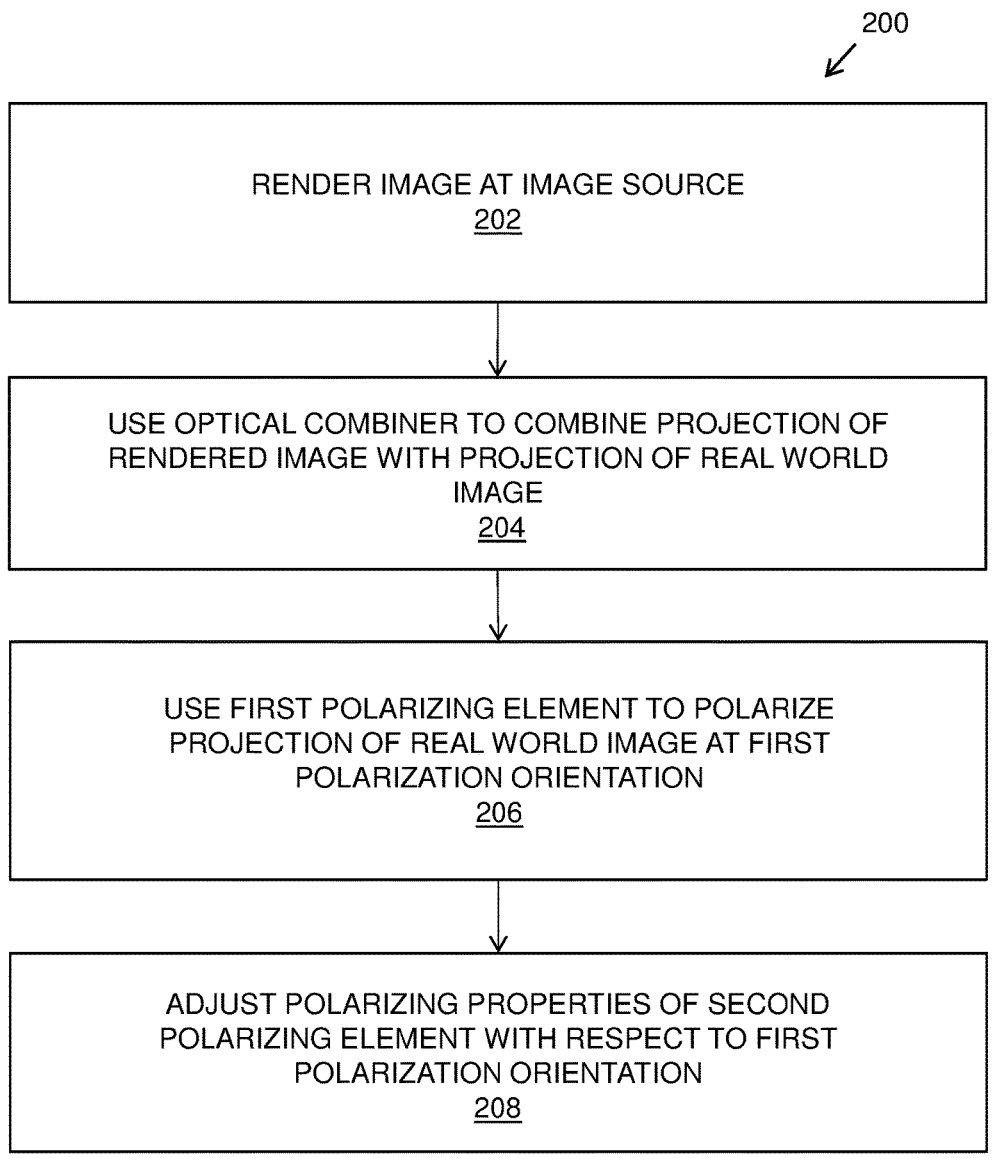
FIG. 2 illustrates steps of a method of displaying via a display apparatus, in accordance with an embodiment of the present disclosure.

Referring to FIG. 2, illustrated are steps of a method 200 of displaying via a display apparatus (such as the display apparatus 100 of FIG. 1) in accordance with an embodiment of the present disclosure. At step 202, an image is rendered at an image source. At step 204, at least one optical combiner is used to combine a projection of the rendered image with a projection of a real world image. At step 206, a first polarizing element is used to polarize the projection of the real world image at a first polarization orientation. The first polarizing element is positioned on a first side of the at least one optical combiner upon which the projection of the real world image is incident. At step 208, polarizing properties of a second polarizing element are adjusted with respect to the first polarization orientation of the first polarizing element. The second polarizing element faces a second side of the at least one optical combiner.

The steps 202 to 208 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A display apparatus (100) comprising:
   an image source (102);
   a processor (104) coupled to the image source (102), wherein the processor (104) is configured to render an image at the image source (102);
   at least one optical combiner (106) for combining a projection of the rendered image with a projection of a real world image, wherein the at least one optical combiner (106) comprises a reflective element for substantially reflecting the projection of the rendered image towards a direction in which the projection of the real world image is directed;
   a first polarizing element (108) for polarizing the projection of the real world image at a first polarization orientation, wherein the first polarizing element (108) is positioned on a first side of the at least one optical combiner (106) upon which the projection of the real world image is incident, whilst the reflective element is positioned on a second side of the at least one optical combiner (106);
   a second polarizing element (110) facing the second side of the at least one optical combiner (106), the second polarizing element (110) having polarization properties for reducing ambient light within the display apparatus, wherein the polarization properties of the second polarizing element (110) are to be adjusted with respect to the first polarization orientation of the first polarizing element (108), and wherein the second polarizing element is movable by an actuator to position the combined projection on eyes of a user; and
   a third polarization element (114) positioned in an optical path between the image source (102) and the at least one optical combiner (106), the third polarizing element (114) having polarization properties for suppressing artifacts of the image rendered at the source.

2. The display apparatus (100) of claim 1, wherein the at least one optical combiner (106) comprises the first polarizing element (108).

3. The display apparatus (100) of claim 1, wherein the polarization properties of the second polarizing element (110) are manually adjustable.

4. The display apparatus (100) of claim 1, further comprising a control unit (118) for electrically controlling the second polarizing element (110) to adjust the polarization properties of the second polarizing element (110), wherein the control unit (118) is coupled to the processor (104), the processor (104) being configured to control the control unit (118) to adjust the polarization properties of the second polarizing element (110).

5. The display apparatus (100) of claim 4, wherein the second polarizing element (110) comprises a plurality of polarizing regions that are individually adjustable to have different polarization properties at a same time.

6. The display apparatus (100) of claim 4, further comprising an ambient light sensor for detecting an intensity of ambient light, the ambient light sensor being coupled to the processor (104), the processor (104) being configured to adjust the polarization properties of the second polarizing element (110), via the control unit (118), to adjust a brightness of the real world image depending on the detected intensity of the ambient light.

7. The display apparatus (100) of claim 1, wherein the processor (104) is configured to control the image source (102) to adjust a brightness of the rendered image.

8. The display apparatus (100) of claim 1, wherein the third polarizing element (114) is configured to polarize the projection of the rendered image at a third polarization orientation, the third polarization orientation being different from the first polarization orientation.

9. The display apparatus (100) of claim 8, wherein the processor (104) is configured to control the control unit (118) to adjust the polarization properties of the second polarizing element (110) with respect to the third polarization orientation of the third polarizing element (114), so as to control a brightness of the rendered image.

10. A method of displaying, via a display apparatus (100) comprising an image source (102), at least one optical combiner (106), and at least a first polarizing element (108), a second polarizing element (110), and a third polarizing element, the method comprising:
    rendering an image at the image source (102);
    using the at least one optical combiner (106) to combine a projection of the rendered image with a projection of a real world image;
    using the first polarizing element (108) to polarize the projection of the real world image at a first polarization orientation, the first polarizing element (108) being positioned on a first side of the at least one optical combiner (106) upon which the projection of the real world image is incident; and adjusting polarizing properties of the second polarizing element (110) with respect to the first polarization orientation of the first polarizing element (108) to reduce ambient light within the display apparatus, the second polarizing element (110) facing a second side of the at least one optical combiner (106);

moving the second polarizing element by an actuator to position the combined projection on eyes of a user; and positioning a third polarizing element (114) in an optical path between the image source (102) and the at least one optical combiner (106), and using the third polarizing element (114) to polarize the image rendered at the image source to suppress artifacts of the rendered image.

11. The method of claim 10, further comprising individually adjusting a plurality of polarizing regions of the second polarizing element (110) to have different polarization properties at a same time.

12. The method of claim 10, further comprising:
using an ambient light sensor of the display apparatus (100) to detect an intensity of ambient light; and
adjusting the polarization properties of the second polarizing element (110) to adjust a brightness of the real world image depending on the detected intensity of the ambient light.

13. The method of claim 10, further comprising controlling the image source (102) to adjust a brightness of the rendered image.

14. The method of claim 10, further comprising polarizing the projection of the rendered image at a polarization orientation different from the first polarization orientation.

15. The method of claim 14, further comprising adjusting the polarization properties of the second polarizing element (110) with respect to the third polarization orientation of the third polarizing element (114), so as to control a brightness of the rendered image.

* * * * *